United States Patent
Stroh et al.

(10) Patent No.: US 6,205,386 B1
(45) Date of Patent: Mar. 20, 2001

(54) METHOD AND ARRANGEMENT FOR AUTOMATICALLY DETERMINING THE DIFFERENTIAL GEAR RATIO

(75) Inventors: Walter Stroh, Cleebronn; Holger Hofmann, Ditzingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/102,760

(22) Filed: Jun. 23, 1998

(30) Foreign Application Priority Data

Jun. 24, 1997 (DE) .............................................. 197 26 743

(51) Int. Cl.$^7$ .................................................... G06F 17/00
(52) U.S. Cl. ................................ 701/51; 701/61; 701/65
(58) Field of Search ................................. 701/51, 61, 65; 477/34, 115, 166, 180, 125, 156, 161

(56) References Cited

U.S. PATENT DOCUMENTS

| | | | |
|---|---|---|---|
| 5,109,944 | * | 5/1992 | Torii ....................................... 180/248 |
| 5,392,215 | * | 2/1995 | Morita ............................... 364/426.04 |
| 5,456,641 | * | 10/1995 | Sawase ..................................... 475/86 |
| 5,752,211 | * | 5/1998 | Takasaki et al. ........................ 701/69 |
| 5,927,422 | * | 7/1999 | Schaket ................................ 180/197 |
| 6,000,378 | * | 12/1999 | Minowa et al. ....................... 123/436 |
| 6,006,149 | * | 12/1999 | Salecker et al. .......................... 701/51 |

FOREIGN PATENT DOCUMENTS

| | | |
|---|---|---|
| 2284641 | 6/1995 | (GB) . |
| 2298252 | 8/1996 | (GB) . |

* cited by examiner

Primary Examiner—William A. Cuchlinski, Jr.
Assistant Examiner—Marthe Marc-Coleman
(74) Attorney, Agent, or Firm—Walter Ottesen

(57) ABSTRACT

The invention is directed to the automatic determination of a quantity which represents the rpm ratio between the transmission and the wheels. For this purpose, first and second rpm values are first detected which represent the rpm of at least one wheel and the rotational speed of a transmission component. Furthermore, a driving state quantity is formed which represents the instantaneous driving state of the motor vehicle. The essence of the invention is that a pregiven driving state can be determined when the formed driving state quantity indicates an essentially steady state driving state. The determination of the rpm transmission ratio which is sought takes place in dependence upon the detected rpm values when the pregiven operating state is detected. Furthermore, the invention relates to a stepped method which, for example, ensures a rapid determination of the differential transmission ratio after a transmission control apparatus is newly built in.

11 Claims, 2 Drawing Sheets

METHOD AND ARRANGEMENT FOR AUTOMATICALLY DETERMINING THE DIFFERENTIAL GEAR RATIO

FIELD OF THE INVENTION

The invention relates to a method and an arrangement for automatically determining a quantity for a motor vehicle which represents the rpm ratio between the transmission and the wheels.

BACKGROUND OF THE INVENTION

From the state of the art, it is known to control (open loop and/or closed loop) the transmission functions via an electronic control apparatus. In this connection, reference can be made, for example, to the publication "Bosch Automotive Handbook", 3rd edition, pages 548 to 551. A differential transmission (axle differential) is arranged between the transmission and the driven wheels and has a specific rpm ratio. The transmission ratio of the axle differential transmission is a quantity which is used in an electronic transmission control in order, for example, to determine the transmission output rpm from the wheel rpms when a transmission output rpm sensor is defective.

It is conventional to build in differential transmissions having different differential transmission ratios into different vehicle models of a series of vehicles. If one would have to provide these different differential transmission ratios in the software of the transmission control apparatus, then this would cause increased complexity because of the different software for the individual vehicle models. In order not to have to provide the differential transmission ratio in the software, a function is integrated into the transmission control apparatus via which the built-in differential transmission ratio can be learned.

SUMMARY OF THE INVENTION

It is an object of the invention to provide a reliable and simple automatic determination of the differential transmission ratio.

In a motor vehicle having a transmission and wheels operatively connected to the transmission, the method of the invention is for automatically determining the rpm ratio ($i_{Diff}$) between the transmission and the wheels. The method includes the steps of: detecting a first rpm value (Nij) representing the rpm of at least one of the wheels; detecting a second rpm value (Nab) representing the rpm of a component of the transmission; forming a driving state quantity (FZ) representing a driving state of the motor vehicle; determining a pregivable operating state when the driving state quantity (FZ) represents a driving state which is essentially a steady state driving state; and, determining the rpm ratio ($i_{Diff}$) in dependence upon the detected rpm values when the pregivable operating state is determined.

The invention proceeds from a motor vehicle having a transmission and wheels wherein a specific rpm ratio is present between the transmission and the wheels. The invention relates to the automatic determination of a quantity which represents the rpm transmission ratio between the transmission and the wheels. For this purpose, first and second rpm values are detected which represent the rpm of at least one wheel and the rpm of a component of the transmission. Furthermore, a driving state quantity is formed which represents the instantaneous driving state of the motor vehicle. The essence of the invention is that a pregiven operating state is then determined when the formed driving state quantity indicates a driving state which is essentially steady state. This means that the pregiven operating state is then determined when the driving state (and therewith especially the formed driving state quantity) remains essentially unchanged as a function of time. The determination of the sought rpm ratio takes place in dependence upon the detected rpm values when the pregiven operating state is detected.

With the procedure of the invention, it is ensured that the automatic determination of the differential transmission ratio is not made incorrect by dynamic driving states. If one would omit consideration of the determination of the pregiven driving state as provided by the invention, then the automatic determination of the differential transmission ratio could lead to a defective detection of the built-in differential transmission ratio because the computation could take place in a dynamic driving state. The risk of a defective detection of the differential transmission ratio can be minimized by limiting the determination of the differential transmission ratio to a driving state having only slight driving dynamics (steady state or quasi steady state driving state).

With the invention, the driving dynamics of the vehicle when automatically determining the differential transmission ratio is considered. In addition to this consideration, a further embodiment of the invention provides for a stepped method which ensures, for example, a rapid determination of the differential transmission ratio after the transmission control apparatus is newly built in. For this purpose, and according to the invention, a preliminary value for the differential transmission ratio is determined in dependence upon the detected rpm values when at least one of the detected rpm values exceeds a pregiven threshold value. The condition for the determination of the preliminary value is therefore only coupled to the condition that the vehicle, in general, has a certain minimum speed. For the determination of the preliminary value, it is at first not considered whether the vehicle is or is not in a driving state which changes greatly as a function of time. In addition, and as described above, a driving state quantity is formed which represents the driving state of the motor vehicle. The pregiven driving state is then likewise determined as described above when the formed driving state quantity indicates a driving state which is essentially steady state. This means that the pregiven driving state is then determined when the driving state and therefore especially the formed driving state quantity remains essentially unchanged as a function of time. Only when this pregiven driving state (steady state or quasi steady state operating state) is present, is a more precise value for the differential transmission ratio determined in dependence upon the detected rpm values.

After a transmission control apparatus is newly built in, under some circumstances, no steady state or quasi steady state driving condition possibly occurs for a relatively long time. For this reason, the second variation of the application leads to the condition that a preliminary value is learned for the differential transmission ratio directly after the transmission control apparatus is built in. This preliminary value is then replaced by a value having a higher reliability when a steady state or quasi steady state driving state is detected. The second variation of the invention thus shows a way to obtain as fast as possible at least an imprecise value for the differential transmission ratio, but also offers the possibility to correct the same.

In an advantageous configuration of the invention, it is provided that the determination of the driving state quantity takes place in dependence upon the detected first and/or the detected second rpm value. That is, the driving state is, for example, determined via the transmission output rpm or via the rpm of the wheel. The pregiven operating state can then be determined when the time-dependent change of the formed driving state quantity lies below a threshold value. It is especially provided that at least the transmission output rpm is applied for determining the driving state quantity.

Furthermore, it can be provided that the driving state quantity is determined in dependence upon: the detected position of the accelerator pedal actuated by the driver; the position of the brake pedal actuated by the driver; and/or, in dependence upon a motor value which represents an operating parameter of the motor of the vehicle.

In a further advantageous embodiment, the differential transmission ratio is only determined when at least one of the detected rpm values exceeds a pregiven threshold value.

The differential transmission ratio, which is determined in accordance with the invention, and/or the specific preliminary value, which is determined according to the invention, for the differential transmission ratio is advantageously stored and is applied to control (open loop and/or closed loop control) the transmission function. In this connection, it is especially provided that the differential transmission ratio replaces the preliminary value determined in accordance with the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
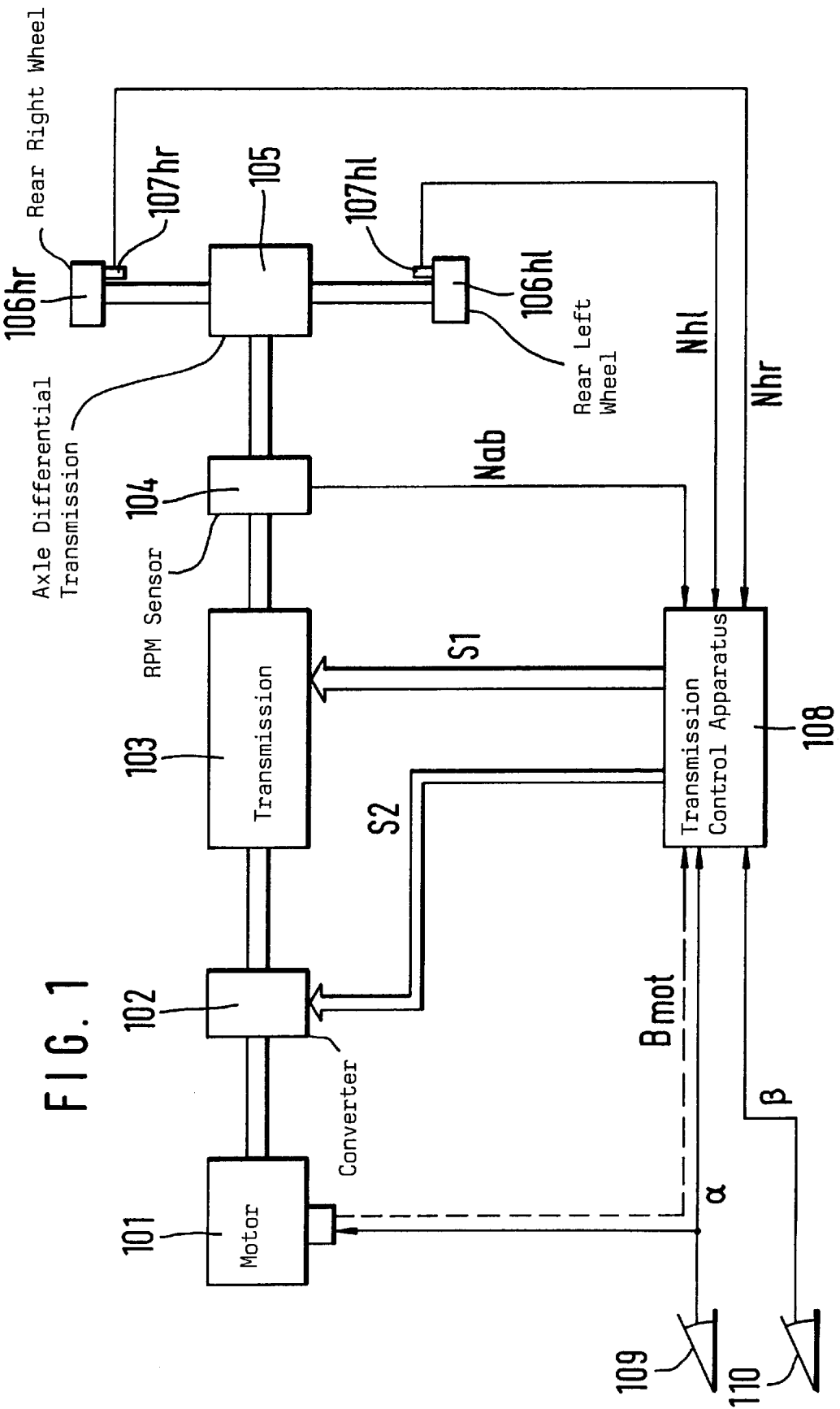
FIG. 1 is an overview block circuit diagram of an embodiment of the arrangement according to the invention; and, FIG. 2 is a flowchart or sequence diagram showing an embodiment of the method of the invention.

FIG. 1 shows a vehicle motor 101 which is connected to the transmission 103 via a converter 102. The transmission output rpm Nab is detected by the sensor 104. The transmission output movement is transmitted via the differential transmission 105 to the rear right wheel 106hr and to the rear left wheel 106hl. The rotational movements Nhl and Nhr of the vehicle wheels are outputted by the wheel rpm sensors 107 hr and 107hl to the transmission control apparatus 108.

The transmission control apparatus 108 receives at the input end (in addition to the already-mentioned wheel rpm signals) the transmission output rpm Nab (sensor 104), the position α of the accelerator pedal 109; the position β of the brake pedal 110 and, optionally, a motor parameter Bmot from the motor control apparatus belonging to the vehicle motor.

As already mentioned, the rpm ratio of the axle differential transmission 105 is a quantity which is used in the electronic transmission control apparatus 108 in order, for example, to determine the transmission output rpm Nab from the wheel rpm Nij when the output rpm sensor 104 is defective. It is conventional that, in a series of motor vehicles being assembled, different differential transmission ratios are built in in different vehicle models. For this reason, the software, which is implemented in the transmission control apparatus 108, must consider the different differential transmission ratios.

A simple use of a learn function for the differential transmission ratio comprises that first the quotient of the output rpm Nab and the mean value of the wheel rpm Nij of the driven wheels is computed as soon as a speed threshold is exceeded. The result of such a computation is, as a rule, relatively imprecise because the input quantities are burdened with measurement errors.

For this reason, in general, all differential transmission ratios possible in a vehicle assembly series are retained in a table. The computed value for the differential transmission ratio is compared to the values in the table. The table value which has the lowest difference to the computed value is used as a valid built-in differential transmission ratio.

For a procedure of this kind, the only condition for the computation of the differential transmission ratio is exceeding a speed threshold. If this speed threshold is, however, exceeded in a driving state of increased dynamics (for example, during an acceleration or a deceleration of the vehicle), then the computed value can become so imprecise because of dead times of the system and filter times of the input signals that a false differential transmission ratio is learned.

This embodiment is based on a multi-step method to determine the differential transmission ratio.

When a transmission control apparatus is newly built into a vehicle, then no differential transmission ratio was learned yet. In this case, it is necessary to make available a value as rapidly as possible. For this reason, the differential transmission ratio is determined as soon as the transmission output rpm threshold is exceeded for the first time after the control apparatus is built in. This determination of the differential transmission ratio is carried out only once after the control apparatus is built into the vehicle in accordance with this embodiment. For this purpose, access can be made to table values as described above.

To eliminate the uncertainty of this first computation of the differential transmission ratio, the computation is repeated in a second stage as soon as the transmission output rpm threshold is exceeded and, additionally, a steady state or quasi steady state condition has been detected. For this purpose, a check is made as to whether the transmission output rpm remains approximately constant over a certain time. Additionally, data as to the brake actuation (actuation β of the brake pedal 110) or as to an accelerator pedal actuation (accelerator pedal position α of the accelerator pedal 109) are processed. For determining the steady state or quasi steady state driving state, also other quantities can be applied, such as engine variables which represent the operating state of the motor of the vehicle.

In the non-dynamic driving state, a significantly more precise computation of the differential transmission ratio is possible. The determination of the differential transmission ratio according to the invention in the non-dynamic driving state is carried out either once after a new start of a vehicle but it can also be repeated (in general only a few times). The differential transmission ratio learned in each case can be stored in a resident memory.

Figure 2:
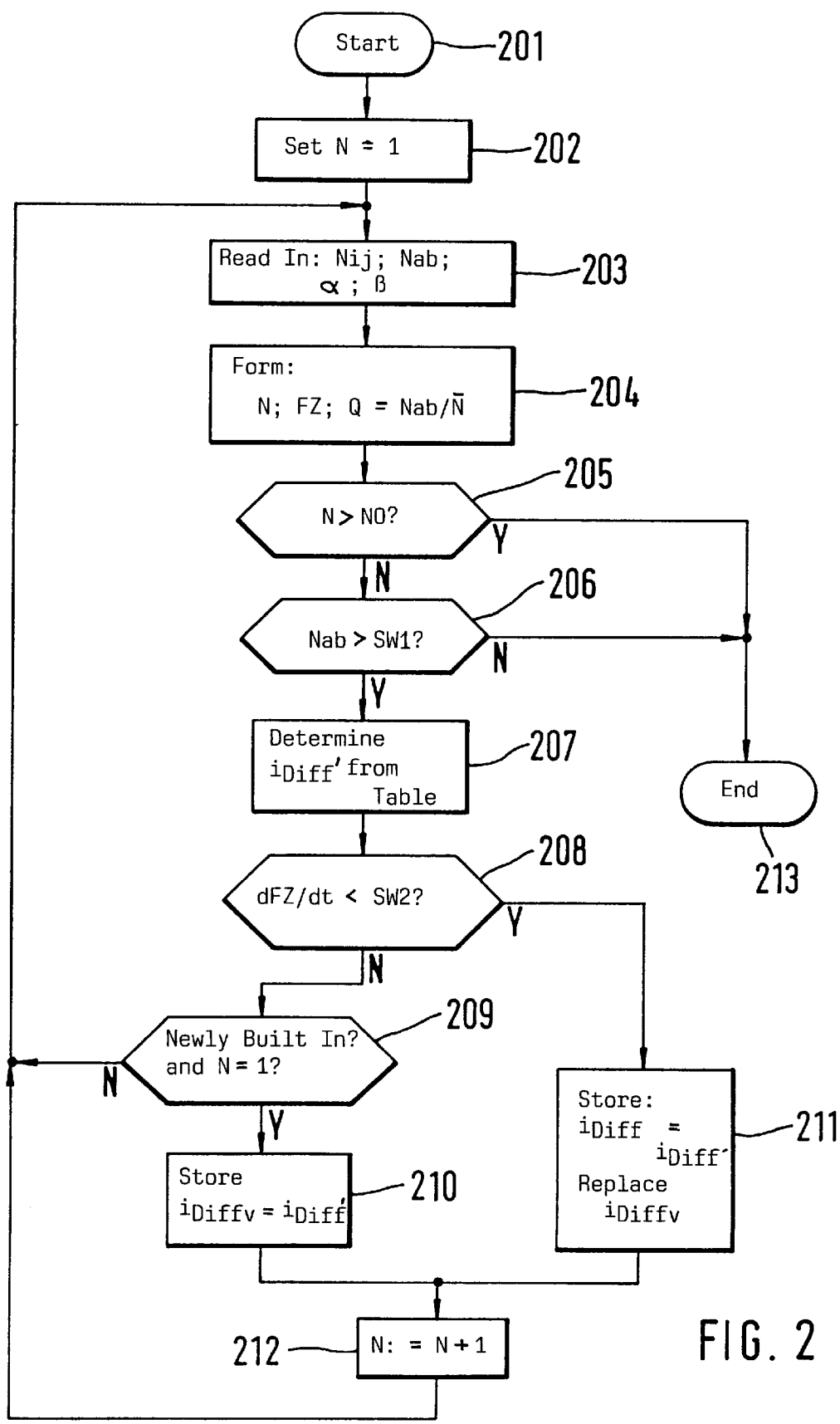

FIG. 2 shows that, after the start step 201, a counter value N is set to the value 1 in step 202. In step 203, the current values of the wheel rpms Nij, the transmission output rpm Nab, the position α of the accelerator pedal and the actuation β of the brake pedal are read in. In step 204, the mean value $\overline{N}$ is computed from the wheel rpms via a mean value formation. Furthermore, the driving state quantity FZ is computed at least in dependence upon the transmission output rpm. In an especially simple variation, the transmission output rpm Nab can be taken directly as the value FZ. Furthermore, the quotient Q of the output rpm Nab and the mean value $\overline{N}$ of the wheel rpms of the driven wheels is formed.

In step 205, an inquiry is made as to whether the counter value N exceeds the threshold value N0. If this is not the case, then an inquiry is made in step 206 as to whether the transmission output rpm Nab exceeds the threshold value SW1. If this is not the case, then (as in the case wherein the numerical value N exceeds the threshold value N0) there is a transition to the end step 213.

However, if the transmission output rpm Nab exceeds the threshold value SW1, then, in step 207, that value $i_{Diff}$, which is closest to the quotient Q, is read out of a table. In step 208, an inquiry is made as to whether the time-dependent change of the driving state quantity has dropped below a second threshold value SW2. If this is not the case, then a dynamic driving state is present whereupon, in step 209, an inquiry is made as to whether the transmission control apparatus is newly built in and whether the counter value N has the value 1. If the counter value N has the value 1, and if, at the same time, the control apparatus 108 is newly built in, then, in step 210, the value for the differential transmission ratio (determined in step 207) is stored as the preliminary value $i_{Diffv}$. However, if it is determined in step 208, that a non-dynamic state is present (that is, a steady state or quasi steady state driving state), then, in step 211, the value determined in step 207 for the differential transmission ratio is stored. A preliminary value $i_{Diffv}$ for the differential transmission ratio, which was under circumstances stored during an earlier passthrough in step 210, is then written over or replaced. In step 212, the numerical value N is incremented by 1.

It is understood that the foregoing description is that of the preferred embodiments of the invention and that various changes and modifications may be made thereto without departing from the spirit and scope of the invention as defined in the appended claims.

What is claimed is:

1. In a motor vehicle including a transmission having an output shaft and wheels operatively connected to said transmission, a method for automatically determining the rpm ratio ($i_{Diff}$) between said output shaft of said transmission and said wheels, the method comprising the steps of:
    detecting at least one of the following:
        (a1) an accelerator pedal value ($\alpha$) representing the position of the accelerator pedal actuable by the driver;
        (b1) a motor value (Bmot) representing at least one operating parameter of the motor of said motor vehicle; and,
        (c1) a brake value ($\beta$) representing an actuation of the brakes of said motor vehicle; and,
        (d1) detecting a first rpm value (Nij) representing the rpm of at least one of said wheels and detecting a second rpm value (Nab) representing the rpm of said output shaft of said transmission;
    forming a driving state quantity (FZ) representing a driving state of said motor vehicle in dependence upon at least one of:
        (a2) said detected accelerator pedal value ($\alpha$);
        (b2) said detected motor value (Bmot); and,
        (c2) said detected brake value ($\beta$); and,
        (d2) said first and second rpm values (Nij and/or Nab);
    determining a time-dependent change (dFZ/dt) of said driving state quantity (FZ);
    determining a pregivable operating state to be present when said time-dependent change (dFZ/dt) lies below a threshold value (SW2) thereby defining an essentially steady-state driving state; and,
    determining said rpm ratio ($i_{Diff}$) in dependence upon the detected rpm values when said pregivable operating state is present.

2. The method of claim 1, comprising the further step of:
    determining said rpm ratio ($i_{Diff}$) in dependence upon said rpm values (Nij, Nab) when at least one of said rpm values exceeds a pregiven threshold value (SW1).

3. In a motor vehicle having a transmission having an output shaft and wheels operatively connected to said transmission, a method for automatically determining the specific rpm ratio ($i_{Diff}$) between said output shaft of said transmission and said wheels, the method comprising the steps of:
    detecting a first rpm value (Nij) representing the rpm of at least one of said wheels;
    detecting a second rpm value (Nab) representing the rpm of said output shaft of said transmission;
    determining a preliminary value ($i_{Diffv}$) for said rpm ratio ($i_{Diff}$) in dependence upon said detected rpm values (Nij, Nab) when at least one of said rpm values (Nij, Nab) exceeds a pregivable threshold value (SW1);
    forming a driving state quantity (FZ) representing a driving state of said motor vehicle;
    determining a pregivable operating state to be present when said driving state quantity (FZ) represents a driving state which is essentially a steady state driving state; and,
    determining said rpm ratio ($i_{Diff}$) in dependence upon the detected rpm values (Nij, Nab) when said pregivable operating state is present.

4. The method of claim 3, comprising the further steps of:
    storing at least one of the following:
        (a) said specific rpm ratio ($i_{Diff}$); and,
        (b) said preliminary rpm ratio ($i_{Diffv}$);
    applying said rpm ratio to control (open loop and/or closed loop) the transmission functions; and,
    replacing said preliminary rpm ratio ($i_{Diffv}$) with said specific rpm ratio ($i_{Diff}$).

5. The method of claim 3, comprising the further steps of:
    forming said driving state quantity (FZ) in dependence upon at least one of said first and second rpm values (Nij and/or Nab); and,
    determining said pregivable operating state when the time-dependent change (dFZ/dt) of said driving state quantity (FZ) lies below a threshold value (SW2).

6. The method of claim 5, comprising the further steps of:
    detecting at least one of the following:
        (a1) an accelerator pedal value ($\alpha$) representing the position of the accelerator pedal actuable by the driver;
        (b1) a motor value (Bmot) representing at least one operating parameter of the motor of said motor vehicle; and,
        (c1 a brake value ($\beta$) representing an actuation of the brakes of said motor vehicle; and,
    forming said driving state quantity (FZ) in dependence upon at least one of the following:
        (a2) said detected accelerator pedal value ($\alpha$);
        (b2) said detected motor value (Bmot); and,
        (c2) said detected brake value ($\beta$); and,
    determining said pregivable operating state when said time-dependent change (dFZ/dt) is less than said threshold value (SW2).

7. In a motor vehicle having a transmission and wheels operatively connected to said transmission, a method for automatically determining the specific rpm ratio ($i_{Diff}$) between said transmission and said wheels, the method comprising the steps of:

detecting a first rpm value (Nij) representing the rpm of at least one of said wheels;

detecting a second rpm value (Nab) representing the rpm of a component of said transmission;

determining a preliminary value ($i_{Diffv}$) for said rpm ratio ($i_{Diff}$) in dependence upon said detected rpm values (Nij, Nab) when at least one of said rpm values (Nij, Nab) exceeds a pregivable threshold value (SW1);

forming a driving state quantity (FZ) representing a driving state of said motor vehicle;

determining a pregivable operating state to be present when said driving state quantity (FZ) represents a driving state which is essentially a steady state driving state; and, determining said rpm ratio ($i_{Diff}$) in dependence upon the detected rpm values (Nij, Nab) when said pregivable operating state is present;

storing at least one of the following:
      (a) said specific rpm ratio ($i_{Diff}$); and,
      (b) said preliminary rpm ratio ($i_{Diffv}$);

applying said rpm ratio to control (open loop and/or closed loop) the transmission functions; and, replacing said preliminary rpm ratio ($i_{Diffv}$) with said specific rpm ratio ($i_{Diff}$);

the determination of said specific rpm ratio ($i_{Diff}$) and/or the determination of said preliminary rpm ratio ($i_{Diffv}$) occurs with pregiven frequency (N0); and, said determination occurs together with a new service introduction of a control unit for controlling (open loop and/or closed loop) the functions of said transmission.

8. In a motor vehicle having a transmission having an output shaft and wheels operatively connected to said transmission, an arrangement for automatically determining the rpm ratio ($i_{Diff}$) between said output shaft of said transmission and said wheels, the arrangement comprising:

first means for detecting a first rpm value (Nij) representing the rpm of at least one of said wheels;

second means for detecting a second rpm value (Nab) representing the rpm of said output shaft of said transmission;

means for forming a driving state quantity (FZ) representing a driving state of said motor vehicle;

means for determining a pregivable operating state to be present when said driving state quantity (FZ) represents a driving state which is essentially a steady state driving state; and, means for determining said rpm ratio ($i_{Diff}$) in dependence upon the detected rpm values when said pregivable operating state is determined.

9. The arrangement of claim 9, comprising:

said means for forming said driving state quantity (FZ) including means functioning to form said driving state quantity (FZ) in dependence upon at least one of said first and second rpm values (Nij and/or Nab); and, said means for determining said pregivable operating state including means functioning to determine said operating state when the time-dependent change (dFZ/dt) of said driving state quantity (FZ) lies below a threshold value (SW2).

10. In a motor vehicle having a transmission having an output shaft and wheels operatively connected to said transmission, an arrangement for automatically determining the rpm ratio ($i_{Diff}$) between said output shaft of said transmission and said wheels, the arrangement comprising:

first means for detecting a first rpm value (Nij) representing the rpm of at least one of said wheels;

second means for detecting a second rpm value (Nab) representing the rpm of said output shaft of said transmission;

means for determining a preliminary value ($i_{Diffv}$) for said rpm ratio ($i_{Diff}$) in dependence upon said detected rpm values (Nij, Nab) when at least one of said rpm values (Nij, Nab) exceeds a pregivable threshold value (SW1);

means for forming a driving state quantity (FZ) representing a driving state of said motor vehicle;

means for determining a pregivable operating state to be present when said driving state quantity (FZ) represents a driving state which is essentially a steady state driving state; and, means for determining said rpm ratio ($i_{Diff}$) in dependence upon the detected rpm values (Nij, Nab) when said pregivable operating state is present.

11. The arrangement of claim 10, comprising:

said means for forming said driving state quantity (FZ) including means functioning to form said driving state quantity (FZ) in dependence upon at least one of said first and second rpm values (Nij and/or Nab); and, said means for determining said pregivable operating state including means functioning to determine said operating state when the time-dependent change (dFZ/dt) of said driving state quantity (FZ) lies below a threshold value (SW2).

* * * * *

UNITED STATES PATENT AND TRADEMARK OFFICE
CERTIFICATE OF CORRECTION

PATENT NO. : 6,205,386 B1
DATED : March 20, 2001
INVENTOR(S) : Walter Stroh and Holger Hofmann It is certified that error appears in the above-identified patent and that said Letters Patent is hereby corrected as shown below:

<u>Column 8,</u>
Line 4, delete "claim 9" and substitute -- claim 8 -- therefor.

Signed and Sealed this

First Day of October, 2002

*Attest:*

JAMES E. ROGAN
*Attesting Officer*      *Director of the United States Patent and Trademark Office*